Dec. 11, 1934.   H. D. GEYER   1,983,796
OSCILLATING PIVOT JOINT
Filed July 30, 1932

Inventor
Harvey D. Geyer
By Spencer Hardman & Fehr
his Attorneys

Patented Dec. 11, 1934

1,983,796

UNITED STATES PATENT OFFICE 1,983,796

OSCILLATING PIVOT JOINT

Harvey D. Geyer, Dayton, Ohio, assignor, by mesne assignments, to General Motors Corporation, Detroit, Mich., a corporation of Delaware Application July 30, 1932, Serial No. 626,990

3 Claims. (Cl. 287—85)

This invention relates to metal-isolating oscillating pivot joint units adapted for use as spring shackles and other various link connections on automobiles. Somewhat similar pivot joint units are now well known.

An object of this invention is to provide a more efficient and improved construction over said known constructions. In similar prior constructions the isolating elastic rubber bushing has had a tendency to gradually flow or work out endwise partially from the retaining metal sleeve after a period of use thus destroying the proper functioning of the joint. This invention practically eliminates such a tendency by providing that each end of the elastic rubber bushing is forced radially inwardly and locked around outwardly facing shoulders on the inner pivot pin so that when the rubber bushing tends to work out endwise at one end of the unit it is retained in place by the interlock of the rubber with the shoulder at the opposite end of the unit as well as by the non-slipping bond between the rubber and the contacting metal parts. Since the fibers of the rubber bushing are in high axial tension (due to said fibers being axially elongated by the radial compression of the bushing) it will be seen that by holding the rubber bushing at the opposite end of the unit as above described will in no wise interfere with the axial tension on the rubber fibers which functions to resist relative axial movement between the pivot pin and outer sleeve which are fixed respectively to the two relatively movable members connected by the unit.

Further objects and advantages of the present invention will be apparent from the following description, reference being had to the accompanying drawing, wherein a preferred embodiment of one form of the present invention is clearly shown.

In the drawing.

Similar reference characters refer to similar parts throughout the several views.

The pivot joint illustrated is adapted for use as a spring shackle unit for automobiles.

The central pivot pin 10 is shown as tubular and is adapted to be rigidly fixed to the side links of an extension shackle or to the side plates of a pivot shackle by a bolt extending therethrough and suitable lock-washers and nut. Pin 10 has reduced diameter projecting end portions 11 which are clamped rigid with said side links or side plates by said through bolt. Such reduced diameter forms the outwardly facing annular shoulders 12 clearly shown in Fig. 2.

Figure 1:
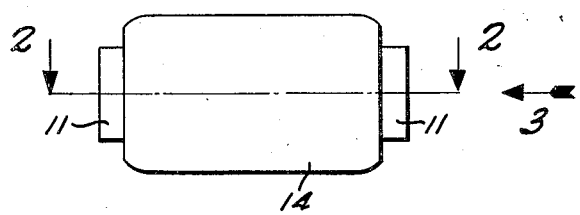
Fig. 1 is a side elevation of a pivot joint unit made according to this invention.
Figure 2:
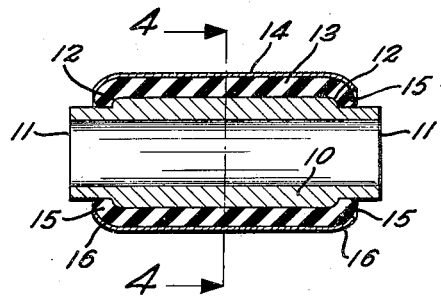
Fig. 2 is a section taken on line 2—2 of Fig. 1.
Figures 3, 4:
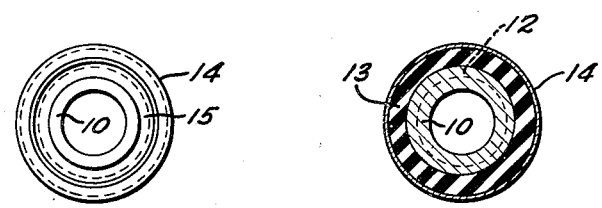
Fig. 3 is an end elevation thereof.
Fig. 4 is a transverse section taken on line 4—4 of Fig. 2.

An elastic non-metal bushing 13, preferably of elastic soft rubber, is slipped over pin 10 and centrally located therewith. Then a cylindrical outer metal sleeve 14 is slipped snugly over bushing 13, after which the metal sleeve 14 is reduced radially in diameter by a suitable swaging operation which highly compresses the rubber bushing 13 and at the same time causes its fibers to axially elongate, or in other words, puts the rubber fibers in axial tension. The original axial length of rubber bushing 13 is such that after said swaging operation its axial length will be so increased that the ends 15 of the rubber bushing will extend somewhat beyond the shoulders 12. Then the ends of the outer sleeve 14 are reduced radially inwardly as shown at 16 thereby highly compressing the ends 15 of the rubber bushing around the outwardly facing shoulders 12 as shown in Fig. 2.

The pivot joint unit, made as above described, may be simply assembled upon the end of an automobile leaf spring by pressing the metal sleeve 14 within an eye in the spring with a tight fit. The pin 10 may be easily fixed later to the shackle side links or to the side plates of a pivot shackle by a through bolt as above described. The oscillatory pivotal movement between the connected parts is taken by an internal twist in the rubber bushing 13 since the rubber is held in such high compression that it will not slip upon the pin 10 or sleeve 14. Lateral thrust upon the shackle, such as occurs when the automobile turns corners, is resisted by the initial tension upon the rubber fibers in bushing 13. In other words any endwise movement of sleeve 14 relative to pin 10 is opposed by the initial tension in the rubber fibers over the full length of the bushing 13 since the opposite end 15 of the bushing 13 on its inner surface is held retained upon pin 10 by the outwardly facing shoulder 12 and on its outer surface is held retained upon sleeve 14 by the inwardly turned ends 16 thereon. Of course such retention by shoulder 12 and flange 16 is in addition to the non-slipping bond of the rubber to the surfaces of pin 10 and sleeve 14.

While the form of embodiment of the present invention as herein disclosed, constitutes a preferred form, it is to be understood that other forms might be adopted, all coming within the scope of the claims which follow.

What is claimed is as follows:

1. A metal-isolating oscillating pivot joint unit adapted to connect two relatively oscillating members, comprising: an inner pivot pin having a cylindrical portion extending nearly the full bearing length of the pin and having reduced end portions forming outwardly facing shoulders between said cylindrical portion and said reduced end portions, an elastic rubber bushing surrounding said cylindrical portion and extending outwardly beyond said shoulders, and an outer metal sleeve surrounding said bushing and extending outwardly beyond said shoulders, said bushing being highly compressed between said pin and said sleeve, and said sleeve having its end portions turned inwardly adjacent said shoulders for compressing the ends of said rubber bushing against said shoulders.

2. A metal-isolating oscillating pivot joint unit adapted to connect two relatively oscillating members, comprising: an inner pivot pin having a main bearing area extending nearly the full length of the pin, said pin having reduced end portions forming outwardly facing shoulders adjacent the ends of the pin, an elastic rubber bushing highly compressed upon said main bearing area of said pin and extending outwardly beyond said shoulders, and an outer metal sleeve retaining said rubber bushing under high initial compression and having radially reduced ends forcing the extreme end portion of said rubber bushing inwardly and compressing the same against said shoulders.

3. A metal-isolating oscillating pivot joint unit adapted to connect two relatively oscillating members, comprising: an inner pivot pin, an elastic non-metal bushing surrounding said pin, and an outer metal sleeve, said bushing being under high initial radial compression, said pivot pin having a bearing portion of slightly less length than the bushing, said bearing portion terminating in outwardly facing shoulders, and said sleeve being longer than said bearing portion and holding the ends of said bushing compressed against said shoulders.

HARVEY D. GEYER.